US012744158B2

(12) United States Patent
Shimada

(10) Patent No.: US 12,744,158 B2
(45) Date of Patent: Sep. 22, 2026

(54) MULTILAYER CERAMIC CAPACITOR INCLUDING INTERNAL ELECTRODE LAYERS INCLUDING FIRST, SECOND, AND THIRD REGIONS INCLUDING DIFFERENT COVERAGES

(71) Applicant: Murata Manufacturing Co., Ltd., Nagaokakyo (JP)

(72) Inventor: Yasuyuki Shimada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 59 days.

(21) Appl. No.: 18/650,285

(22) Filed: Apr. 30, 2024

(65) Prior Publication Data

US 2024/0282522 A1 Aug. 22, 2024

Related U.S. Application Data

(63) Continuation of application No. PCT/JP2023/022726, filed on Jun. 20, 2023.

(30) Foreign Application Priority Data

Jul. 12, 2022 (JP) ................................. 2022-111971

(51) Int. Cl.
*H01G 4/012* (2006.01)
*H01G 4/12* (2006.01)
(Continued)

(52) U.S. Cl.
CPC ............. *H01G 4/012* (2013.01); *H01G 4/232* (2013.01); *H01G 4/30* (2013.01); *H01G 4/12* (2013.01)

(58) Field of Classification Search
CPC .......... H01G 4/012; H01G 4/232; H01G 4/30; H01G 4/12; H01G 4/1209; Y02E 60/13
See application file for complete search history.

(56) References Cited

U.S. PATENT DOCUMENTS

| | | | | |
|---|---|---|---|---|
| 2013/0002388 A1 | 1/2013 | Kim et al. | | |
| 2013/0094118 A1* | 4/2013 | Kim | ........................ | H01G 4/30 361/301.4 |

(Continued)

FOREIGN PATENT DOCUMENTS

| | | |
|---|---|---|
| JP | 2001035747 A | 2/2001 |
| JP | 2011204849 A | 10/2011 |

(Continued)

OTHER PUBLICATIONS

International Search Report in PCT/JP2023/022726, mailed Sep. 12, 2023, 3 pages.

(Continued)

*Primary Examiner* — Timothy J. Dole
(74) *Attorney, Agent, or Firm* — Keating & Bennett, LLP

(57) ABSTRACT

A multilayer ceramic capacitor includes a multilayer body including dielectric layers and internal electrode layers that are laminated, first and second main surfaces opposed to each other in a lamination direction, first and second lateral surfaces opposed to each other in a width direction orthogonal or substantially orthogonal to the lamination direction, and first and second end surfaces opposed to each other in a length direction orthogonal or substantially orthogonal to the lamination direction and the width direction. The multilayer body further includes external electrodes that are respectively provided on the first end surface and the second end surface and connected to the internal electrode layers. The internal electrode layers each include first and second regions respectively including different coverages. The first region includes a larger coverage than the second region. The first region is connected to a corresponding one of the external electrodes.

20 Claims, 9 Drawing Sheets

(51) Int. Cl.

| | |
|---|---|
| ***H01G 4/232*** | (2006.01) |
| ***H01G 4/30*** | (2006.01) |

(56) References Cited

U.S. PATENT DOCUMENTS

| | | | | |
|---|---|---|---|---|
| 2013/0342956 | A1 | 12/2013 | Konishi et al. | |
| 2015/0116898 | A1 * | 4/2015 | Takashima | H01G 4/012 361/301.4 |
| 2016/0217930 | A1 | 7/2016 | Yamaguchi et al. | |
| 2016/0293331 | A1 * | 10/2016 | Kitamura | H01G 4/12 |
| 2018/0268999 | A1 | 9/2018 | Shimada et al. | |
| 2021/0104364 | A1 | 4/2021 | Okuda | |
| 2021/0210257 | A1 * | 7/2021 | Hofstätter | H01C 1/1413 |
| 2023/0137809 | A1 * | 5/2023 | Suemasa | H01G 4/008 361/301.4 |
| 2023/0307181 | A1 * | 9/2023 | Amano | H01G 4/232 |

FOREIGN PATENT DOCUMENTS

| | | | | |
|---|---|---|---|---|
| JP | 2013016770 | A | | 1/2013 |
| JP | 2014007187 | A | | 1/2014 |
| JP | 2015111651 | A | | 6/2015 |
| JP | 2016136557 | A | | 7/2016 |
| JP | 2018152547 | A | | 9/2018 |
| JP | 2021061302 | A | | 4/2021 |
| JP | 2021168337 | A | | 10/2021 |
| KR | 20150016399 | A | * | 2/2015 |

OTHER PUBLICATIONS

Written Opinion in PCT/JP2023/022726, mailed Sep. 12, 2023, 3 pages.

Official Communication issued in corresponding Indian Patent Application No. 202417039918, mailed on Jul. 15, 2026, 9 pages.

* cited by examiner 1
2
5
5a
5ad
5af
5b
5bd
5bf
7
7a
7b
3a
3a1
3a2
3a3
3aE
3aM
3b
3b1
3b2
3b3
3bE
3bM
E1
E2
EG1
EG2
LF
L
T
M1
M2
R5
OL1
OL2
IL 10b
10a
A4
A2
5b
A3
A1
A1
A3
A2
5a
A4
7
7
601
W
EG1
LF
EG2
EG1
LF
EG2
L
CL
5
7
T
602
LE
L
LE

MULTILAYER CERAMIC CAPACITOR INCLUDING INTERNAL ELECTRODE LAYERS INCLUDING FIRST, SECOND, AND THIRD REGIONS INCLUDING DIFFERENT COVERAGES

CROSS REFERENCE TO RELATED APPLICATIONS

This application claims the benefit of priority to Japanese Patent Application No. 2022-111971 filed on Jul. 12, 2022 and is a Continuation Application of PCT Application No. PCT/JP2023/022726 filed on Jun. 20, 2023. The entire contents of each application are hereby incorporated herein by reference.

BACKGROUND OF THE INVENTION

1. Field of the Invention

The present invention relates to multilayer ceramic capacitors.

2. Description of the Related Art

A technique for improving coverage (a covering ratio) of internal electrode layers in a multilayer ceramic capacitor is known. For example, Japanese Unexamined Patent Application Publication No. 2014-7187 discloses that a structural defect of internal electrode layers is suppressed by setting the average crystal grain size of the internal electrode layers to 0.1 μm or less. As a result of suppressing the structural defects of the internal electrode layers, the coverage of the internal electrode layers is improved. When the coverage of the internal electrode layers is improved, the area connected to the external electrodes increases, and Equivalent Series Resistance (ESR) is suppressed.

SUMMARY OF THE INVENTION

In the multilayer ceramic capacitor, there are portions where the internal electrode layers and the dielectric layers are bonded to each other and portions where the dielectric layer and the dielectric layer are bonded to each other. There is a tendency that peeling easily occurs at the portions where the internal electrode layers and the dielectric layers are bonded to each other as compared with the portions where the dielectric layers and the dielectric layers are bonded to each other. When the coverage of the internal electrode layers increases, the adhesion between the internal electrode layers and the dielectric layers generally decreases. Therefore, when the coverage of the internal electrode layers is improved and the coverage increases, the reliability of the multilayer ceramic capacitor may decrease. In view of the above, example embodiments of the present invention provide multilayer ceramic capacitors that are each able to maintain both the contact property between internal electrode layers and external electrodes and adhesion between the internal electrode layers and dielectric layers.

An example embodiment of the present invention provide a multilayer ceramic capacitor that includes a multilayer body including a plurality of dielectric layers and a plurality of internal electrode layers that are laminated, the multilayer body further including a first main surface and a second main surface that are opposed to each other in a lamination direction, a first lateral surface and a second lateral surface that are opposed to each other in a width direction orthogonal or substantially orthogonal to the lamination direction, and a first end surface and a second end surface that are opposed to each other in a length direction orthogonal or substantially orthogonal to the lamination direction and the width direction, and external electrodes that are respectively provided on the first end surface and the second end surface and connected to the plurality of internal electrode layers. The plurality of internal electrode layers each include a first region and a second region respectively including different coverages. The first region includes a larger coverage than the second region. The first region is connected to a corresponding one of the external electrodes.

According to the example embodiments of the present invention, it is possible to provide multilayer ceramic capacitors that are each able to maintain both the contact property between internal electrode layers and external electrodes and adhesion between the internal electrode layers and dielectric layers.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
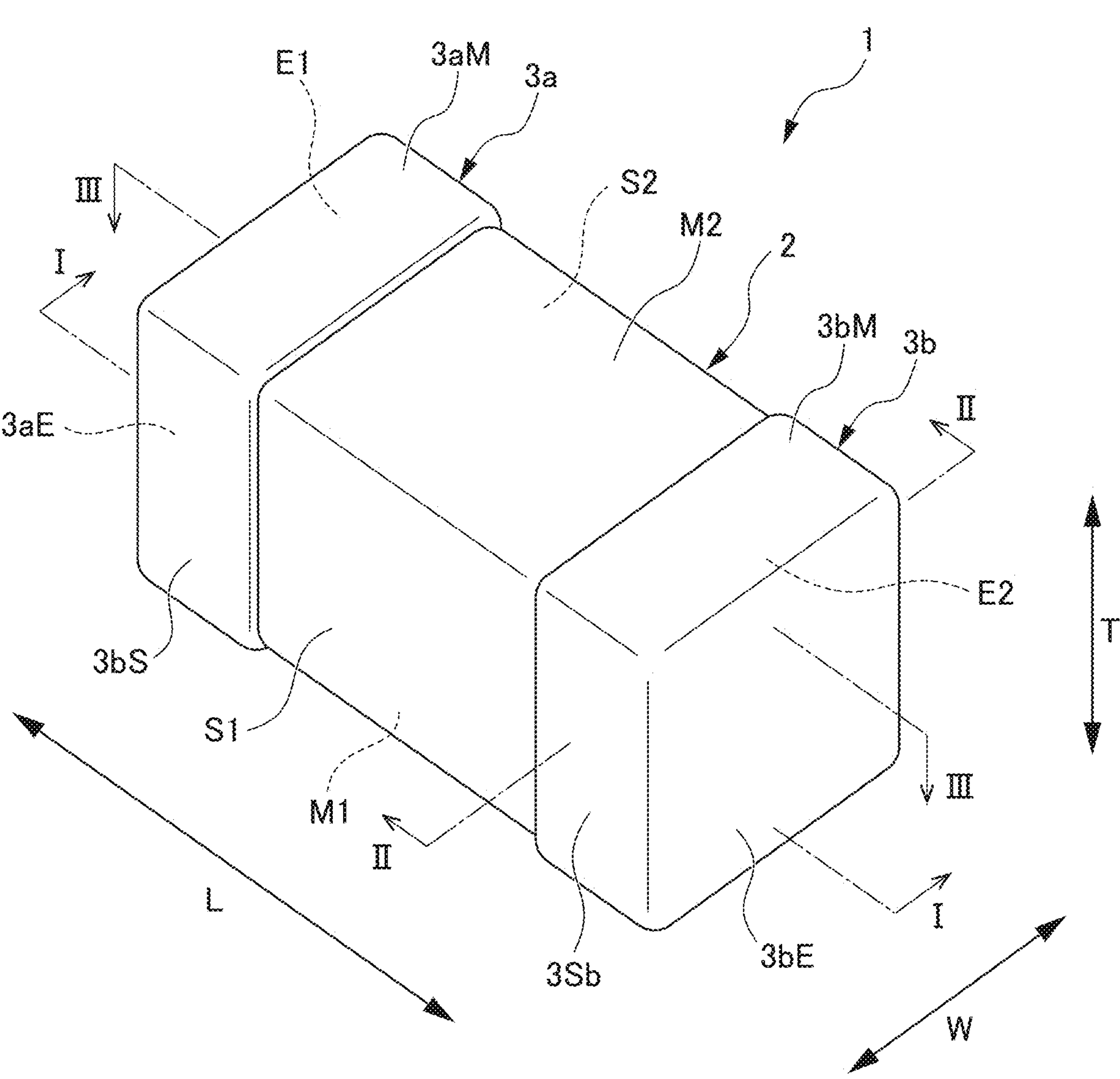
FIG. 1 is a perspective view of a multilayer ceramic capacitor according to an example embodiment of the present invention.

Hereinafter, example embodiments of the present invention will be described with reference to the accompanying drawings. In the drawings, the same or corresponding portions are denoted by the same reference numerals.

Outer Shape of Multilayer Ceramic Capacitor

The outline of the appearance of the multilayer ceramic capacitor 1 will be described with reference to FIG. 1. FIG. 1 is a perspective view of a multilayer ceramic capacitor 1 according to an example embodiment of the present invention. As shown in FIG. 1, the multilayer ceramic capacitor 1 includes a multilayer body 2 and external electrodes 3.

Definition of Direction

Figure 2:
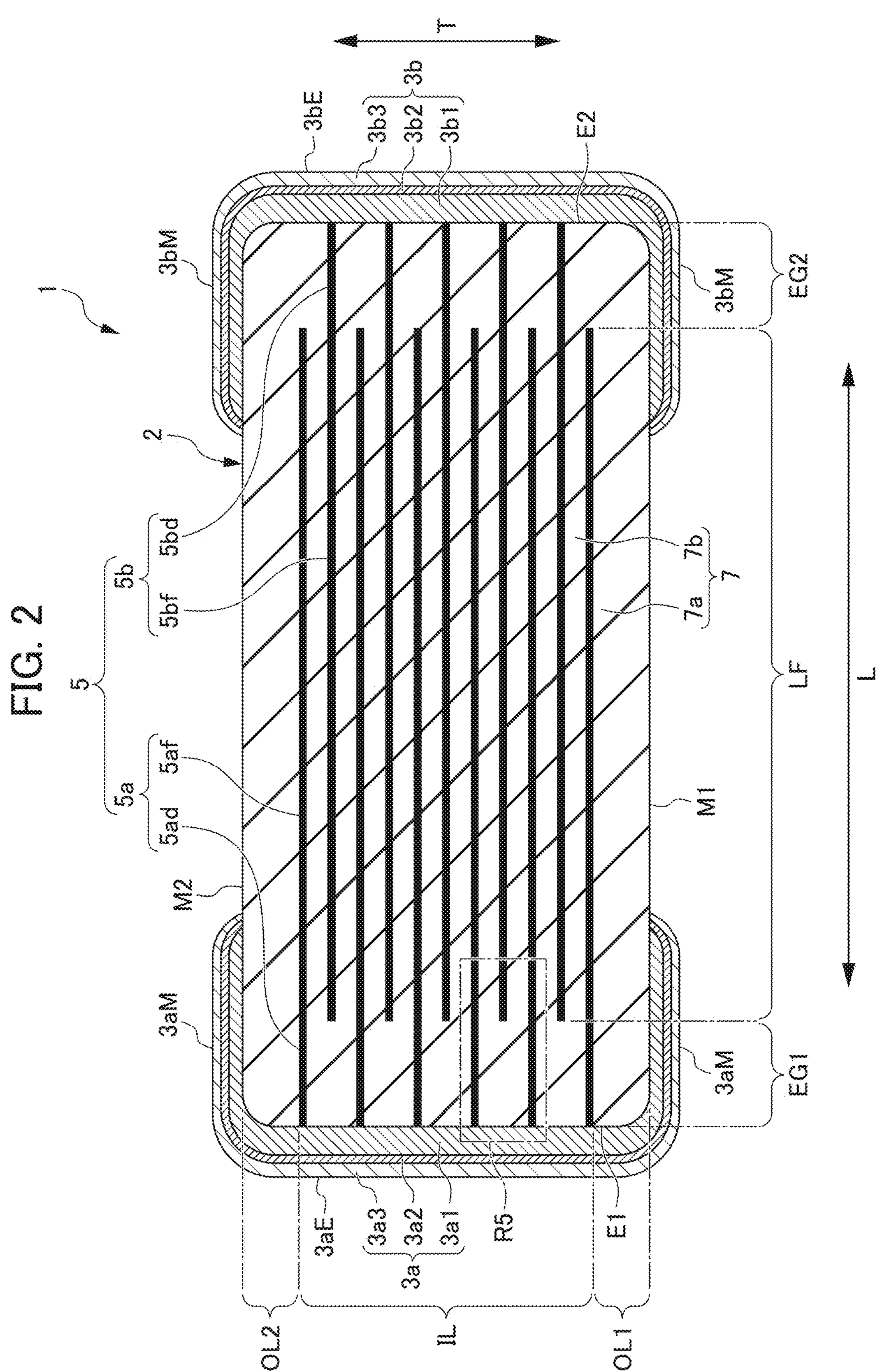
FIG. 2 is a cross-sectional view taken along the line I-I of FIG. 1.
Figure 3:
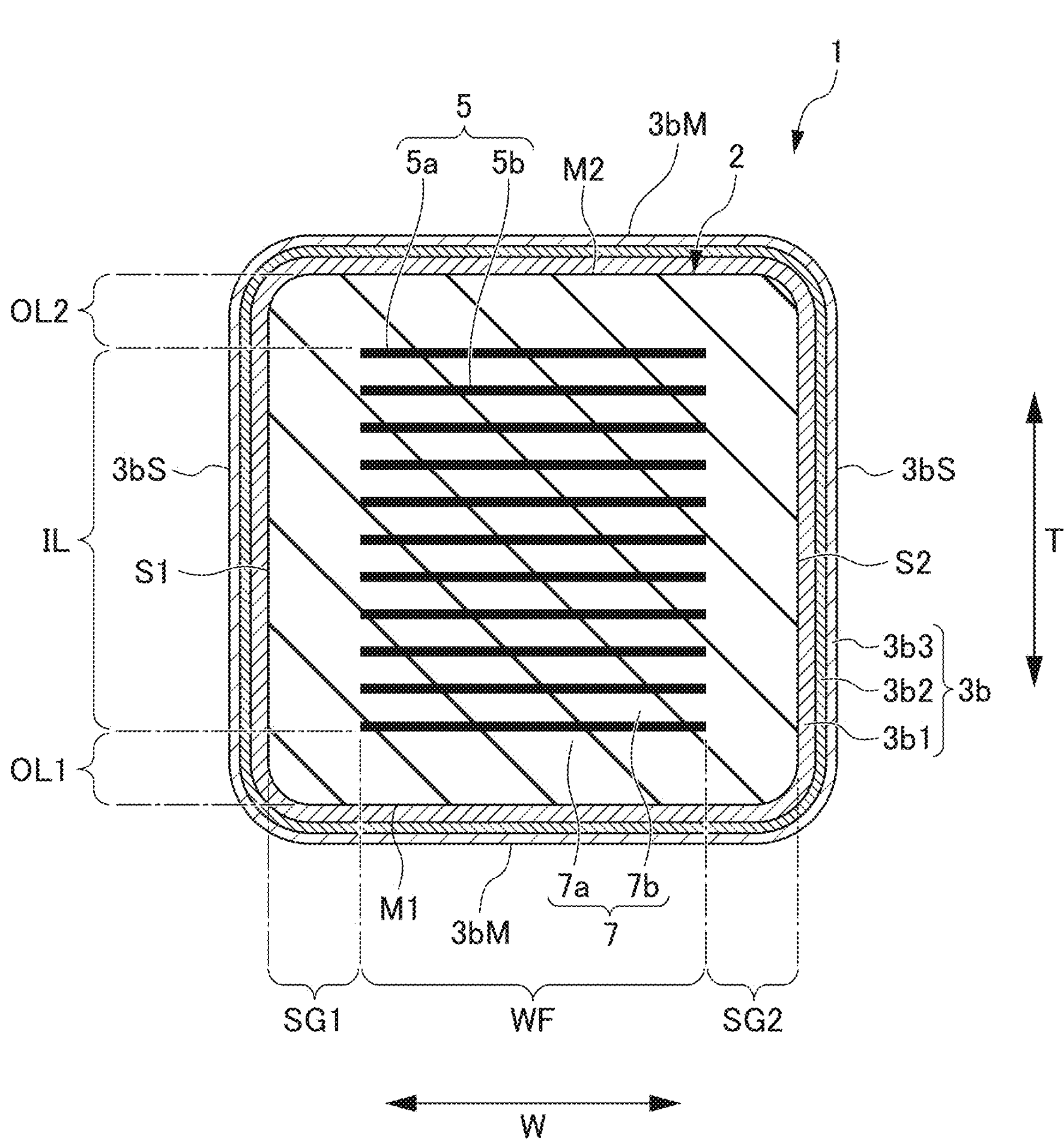
FIG. 3 is a cross-sectional view taken along the line II-II of FIG. 1.
Figure 4:
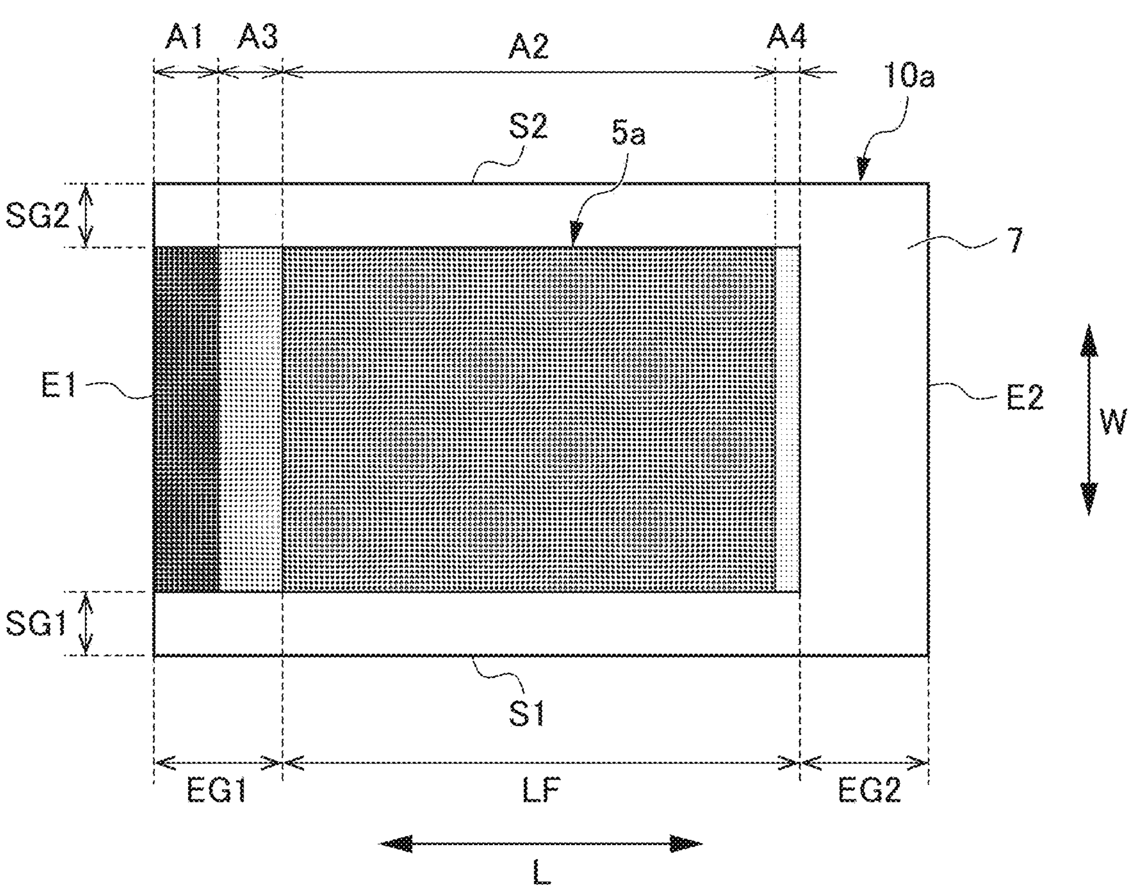
FIG. 4 is a cross-sectional view taken along the line III-III of FIG. 1.

In FIGS. 1 to 9, the L direction, the W direction, and the T direction are shown. The L direction refers to the length direction L of the multilayer ceramic capacitor 1. The W direction refers to the width direction W of the multilayer ceramic capacitor 1. The T direction refers to the lamination (stacking) direction T of the multilayer ceramic capacitor 1. Accordingly, the cross section shown in FIG. 2 is referred to as an LT cross section, the cross section shown in FIG. 3 is referred to as a WT cross section, and the cross section shown in FIG. 4 is referred to as an LW cross section. The length direction L, the width direction W, and the lamination direction T are not necessarily orthogonal to each other. The length direction L, the width direction W, and the lamination direction T may intersect each other.

Outer Shape of Multilayer Body

As shown in FIG. 1, the multilayer body 2 has a substantially rectangular parallelepiped shape. The multilayer body includes two main surfaces, two end surfaces and two lateral surfaces. The main surfaces are opposed to each other in the lamination direction T. The end surfaces are opposed to each other in the length direction L. The lateral surfaces are opposed to each other in the width direction W. The two main surfaces include a first main surface M1 and a second main surface M2. The two end surfaces include a first end surface E1 and a second end surface E2. The two lateral surfaces include a first lateral surface S1 and a second lateral surface S2.

The multilayer body 2 includes ridge portions and corner portions which are preferably rounded. Each of the ridge portions refers to a portion where two surfaces of the multilayer body 2 intersect with each other. Each of the corner portions refers to a portion where three surfaces of the multilayer body 2 intersect with each other.

Size of Multilayer Body

The size of the multilayer body 2 can be set as follows, for example. That is, a dimension of the multilayer body 2 in the length direction L can be about 200 μm or more and about 3500 μm or less, for example. A dimension of the multilayer body 2 in the lamination direction T may be about 100 μm or more and about 2800 μm or less, for example. A dimension of the multilayer body 2 in the width direction W may be about 100 μm or more and about 2800 μm or less, for example. The dimension of each portion of the multilayer body 2 can be measured with a micrometer or an optical microscope.

Internal Structure of Multilayer Body (LT Cross-Section)

The internal structure of the multilayer body 2 will be described with reference to FIG. 2. FIG. 2 is a cross-sectional view taken along the line I-I of the multilayer ceramic capacitor shown in FIG. 1. As shown in FIG. 2, the multilayer body 2 includes a plurality of dielectric layers 7 and a plurality of internal electrode layers 5. The plurality of dielectric layers 7 and the plurality of internal electrode layers 5 are stacked or laminated on each other in the lamination direction T.

Inner Layer Portion and Outer Layer Portion

The multilayer body 2 includes an inner layer portion IL, and a first outer layer portion OL1 and a second outer layer portion OL2 which are two outer layer portions OL that sandwich the inner layer portion IL therebetween in the lamination direction T.

The inner layer portion IL includes a portion of the plurality of dielectric layers 7 and a plurality of internal electrode layers 5. In the inner layer portion IL, the plurality of internal electrode layers 5 are opposed to each other with each of the plurality of dielectric layers 7 interposed therebetween. The inner layer portion IL is a portion that generates a capacitance, and thus substantially functions as a capacitor. In view of the above, the inner layer portion IL also refers to an effective region in the lamination direction T.

The first outer layer portion OL1 is adjacent to the first main surface M1 of the multilayer body 2, and the second outer layer portion OL2 is adjacent to the second main surface M2 of the multilayer body 2. Specifically, the first outer layer portion OL1 is provided between the first main surface M1 and an internal electrode layer 5 closest to the first main surface M1 among the plurality of internal electrode layers 5. The second outer layer portion OL2 is provided between the second main surface M2 and an internal electrode layer 5 closest to the second main surface M2 among the plurality of internal electrode layers 5. The first outer layer portion OL1 and the second outer layer portion OL2 do not include any internal electrode layer 5, but include dielectric layers 7 excluding the dielectric layer 7 in the inner layer portion IL among the plurality of dielectric layers 7. The first outer layer portion OL1 and the second outer layer portion OL2 each function as a protective layer of the inner layer portion IL.

Dielectric Layer

The plurality of dielectric layers 7 include outer dielectric layers 7*a* and inner dielectric layers 7*b*.

Outer Dielectric Layer

The outer dielectric layers 7*a* are dielectric layers 7 serving as the first outer layer portion OL1 and the second outer layer portion OL2 among the plurality of dielectric layers 7. The outer dielectric layers 7*a* are respectively located between the first main surface M1 and the internal electrode layer 5 closest to the first main surface M1, and between the second main surface M2 and the internal electrode layer 5 closest to the second main surface M2.

Inner Dielectric Layer

The inner dielectric layers 7*b* are dielectric layers 7, each of which is located between the internal electrode layers 5 and serves as the inner layer portion IL together with the internal electrode layers 5. The inner dielectric layers 7*b* are each located between the first internal electrode layer 5*a* and the second internal electrode layer 5*b* described below.

Number of Dielectric Layers

The number of dielectric layers 7 laminated on the multilayer body 2 can be, for example, 10 or more and 1800 or less. The number of dielectric layers 7 includes the number of outer dielectric layers 7*a* and the number of inner dielectric layers 7*b*.

Thickness of Dielectric Layer

The thickness of each of the outer dielectric layers 7*a* of the dielectric layer 7 can be, for example, about 10 μm or more and about 200 μm or less. The thickness of each of the inner dielectric layers 7*b* can be, for example, about 0.3 μm or more and about 5.0 μm or less.

Dielectric Layer Material

The material of the dielectric layers 7 may be a dielectric ceramic including, for example, $BaTiO_3$, $CaTiO_3$, $SrTiO_3$, $CaZrO_3$, or $TiO_2$. The dielectric layers 7 may be prepared by adding a Mn compound, a Fe compound, a Cr compound, a Co compound, a Ni compound, or the like to the dielectric ceramic.

Internal Electrode Layer

The internal electrode layers 5 includes first internal electrode layers 5*a* and second internal electrode layers 5*b*. Each of the first internal electrode layers 5*a* is connected to the first external electrode 3*a*. Each of the second internal electrode layers 5*b* is connected to the second external electrode 3*b*. Each of the first internal electrode layers 5*a* extends from the first end surface E1 toward the second end surface E2. Each of the second internal electrode layers 5*b* extends from the second end surface E2 toward the first end surface E1.

Counter Portion and Extension Portion

The first internal electrode layers 5*a* and the second internal electrode layers 5*b* each have a counter electrode portion and an extension electrode portion. Each of the counter electrode portions is a portion of the internal electrode layer 5 where the first internal electrode layer 5*a* and the second internal electrode layer 5*b* are opposed to each other in the lamination direction T. Each of the extension electrode portions is a portion of the internal electrode layer 5 which extends from the counter electrode portion toward the end surface E1 or the end surface E2 of the multilayer body 2.

Each of the counter electrode portions of the first internal electrode layers 5*a* is referred to as a first counter electrode portion 5*af*, and each of the extension electrode portions of the first internal electrode layers 5*a* is referred to as a first extension electrode portion 5*ad*. Each of the first extension electrode portions 5*ad* is a portion extending from the first counter electrode portion 5*af* to the first end surface E1 of the multilayer body 2. Similarly, each of the counter electrode portions of the second internal electrode layers 5*b* is referred to as a second counter electrode portion 5*bf*, and each of the extension electrode portions of the second internal electrode layers 5*b* is referred to as a second extension electrode portion 5*bd*. Each of the second extension electrode portions 5*bd* is a portion extending from the second counter electrode portion 5*bf* to the second end surface E2 of the multilayer body 2.

Number of Internal Electrode Layers

The number of the internal electrode layers 5 may be, for example, 10 or more and 1800 or less. The number of the internal electrode layers 5 is a number including the number of the first internal electrode layers 5*a* and the number of the second internal electrode layers 5*b*.

Thickness of Internal Electrode Layer

The thickness of each of the internal electrode layers 5 can be, for example, about 0.3 μm or more and about 5.0 μm or less.

Material of Internal Electrode Layer

The material of the internal electrode layers 5 may be, for example, a metal such as Ni, Cu, Ag, Pd, or Au, an alloy of Ni and Cu, or an alloy of Ag and Pd. The material of the internal electrode layers 5 may further include dielectric particles of the same composition as the ceramic contained in the dielectric layer 7.

Electrode Counter Portion

The segmentation of the multilayer body 2 in the length direction L will be described. The multilayer body 2 includes an electrode counter portion LF, and a first end gap portion EG1 and a second end gap portion EG2 which are two end gap portions EG in the length direction L. The electrode counter portion LF refers to a portion where the first internal electrode layers 5*a* and the second internal electrode layers 5*b* are opposed to each other in the lamination direction T. That is, a portion where the first counter electrode portions 5*af* and the second counter electrode portions 5*bf* are opposed to each other in the lamination direction T is the electrode counter portion LF. The electrode counter portion LF is located in the middle in the length direction L of the multilayer body 2. A capacitance is generated by the first counter electrode portions 5*af* and the second counter electrode portions 5*bf* being opposed to each other with each of the plurality of inner dielectric layers 7*b* interposed therebetween. In view of the above, the electrode counter portion LF also refers to an effective region in the length direction L.

End Gap Portion

Each of the end gap portions refers to a portion where the first internal electrode layers 5*a* and the second internal electrode layers 5*b* are not opposed to each other in the lamination direction T. Specifically, a portion where the first internal electrode layers 5*a* are provided and the second internal electrode layers 5*b* are not provided in the lamination direction T, refers to the first end gap portion EG1. Similarly, a portion where the second internal electrode layers 5*b* are provided and the first internal electrode layers 5*a* are not provided refers to the second end gap portion EG2.

The first end gap portion EG1 corresponds to a portion where the first extension electrode portions 5*ad* are provided, and the second end gap portion EG2 corresponds to a portion where the second extension electrode portions 5*bd* are provided. The first end gap portion EG1 functions as an extension electrode to the first end surface E1 of the first internal electrode layer 5*a*, and the second end gap portion EG2 functions as an extension electrode to the second end surface E2 of the second internal electrode layer 5*b*. Since each of the end gap portions EG is a segment in the length direction L, it is also referred to as an L gap.

The dimension of each of the end gap portions EG in the length direction L may be, for example, about 5 μm or more and about 30 μm or less.

External Electrode

The external electrodes include a first external electrode 3*a* and a second external electrode 3*b*. The first external electrode 3*a* refers to an external electrode provided on the first end surface E1 of the multilayer body 2. The first external electrode 3*a* is electrically connected to each of the first internal electrode layers 5*a*. The first external electrode 3*a* extends from the first end surface E1 to a portion of each of the two main surfaces and a portion of each of the two lateral surfaces. A portion of the first external electrode 3*a* provided on the first end surface E1 of the multilayer body 2 is referred to as an end surface external electrode 3*a*E. A portion of the first external electrode 3*a* provided on a portion of the first main surface M1 or a portion of the second main surface M2 is referred to as a main surface external electrode 3*a*M. A portion of the first external electrode 3*a* provided on a portion of the first lateral surface S1 or a portion of the second lateral surface S2 is referred to as a lateral surface external electrode 3*a*S.

The second external electrode 3*b* refers to an external electrode provided on the second end surface E2 of the multilayer body 2. The second external electrode 3*b* is electrically connected to each of the second internal electrode layers 5*b*. The second external electrode 3*b* includes the same configuration as the first external electrode 3*a*. That is, the second external electrode 3*b* extends from the second end surface E2 to a portion of each of the two main surfaces and a portion of each of the two lateral surfaces. A portion of the second external electrode 3*b* provided on the second end surface E2 of the multilayer body 2 is referred to as an end surface external electrode 3*b*E. A portion of the second external electrode 3*b* provided on a portion of the first main surface M1 or a portion of the second main surface M2 is referred to as a main surface external electrode 3*b*M. A portion of the second external electrode 3*b* provided on a portion of the first lateral surface S1 or a portion of the second lateral surface S2 is referred to as a lateral surface external electrode 3*b*S.

Layer Configuration of External Electrode

The layer configuration of the external electrode 3 will be described with reference to FIG. 2. The first external electrode 3*a* includes a first base electrode layer 3*a*1, a first inner plated layer 3*a*2, and a first surface plated layer 3*a*3, and similarly, the second external electrode 3*b* includes a second base electrode layer 3*b*1, a second inner plated layer 3*b*2, and a second surface plated layer **3*b*3. Hereinafter, the layer configuration of the external electrode 3 will be described based on the first external electrode 3*a*. The description based on the first external electrode 3*a* also applies to the second external electrode 3*b*. This is because the first external electrode 3*a* and the second external electrode 3*b*** have the same configuration, although their surfaces on which they are provided are different from each other.

The first base electrode layer **3*a*1 is provided on the first end surface E1 of the multilayer body 2 and covers the first end surface E1 of the multilayer body 2. The first base electrode layer 3*a*1 may extend from the first end surface E1 to a portion of the first main surface M1, a portion of the second main surface M2, a portion of the first lateral surface S1, and a portion of the second lateral surface S2**.

The first base electrode layer **3*a*1** may be a fired layer including a metal and glass. Examples of the glass include glass components including at least one selected from B, Si, Ba, Mg, Al, Li, and the like. As a specific example, borosilicate glass can be used. The metal includes Cu as a main component. The metal may include, as a main component, at least one selected from a metal such as Ni, Ag, Pd, or Au, and an alloy such as an Ag—Pd alloy, or may include a component other than the main component.

The fired layer refers to a layer obtained by applying an electrically conductive paste including a metal and glass to a multilayer body by a dipping method and firing the paste. The fired layer may be fired after firing the internal electrode layers, or may be fired simultaneously with firing of the internal electrode layers. The fired layer may include a plurality of layers.

The first base electrode layer **3*a*1** may be a resin layer including electrically conductive particles and a thermosetting resin. The resin layer may be provided on the above-described fired layer, or may be directly provided on the multilayer body without providing the fired layer.

The resin layer is a layer obtained by applying an electrically conductive paste including electrically conductive particles and a thermosetting resin to a multilayer body by a coating method, and firing the paste. The resin layer may be fired after firing the internal electrode layers, or may be fired simultaneously with firing of the internal electrode layers. The resin layer may include a plurality of layers.

The thickness per one layer of each of the first base electrode layer **3*a*1 and the second base electrode layer 425** functioning as the fired layer or the resin layer is not particularly limited, and may be about 1 μm or more and about 10 μm or less, for example.

The first base electrode layer **3*a*1** is formed by a thin film forming method such as sputtering or vapor deposition, and may be a thin film layer having a thickness of about 1 μm or less on which metal particles are deposited, for example.

The first inner plated layer **3*a*2 is provided on the first base electrode layer 3*a*1 and covers at least a portion of the first base electrode layer 3*a*1. The first inner plated layer 3*a*2** includes, for example, at least one selected from a metal such as Cu, Ni, Ag, Pd, or Au, and an alloy such as an Ag—Pd alloy.

The first surface plated layer **3*a*3 is provided on the first inner plated layer 3*a*2 and covers at least a portion of the first inner plated layer 3*a*2. The first surface plated layer 3*a*3** includes, for example, a metal such as Sn.

Preferably, the first inner plated layer **3*a*2 is a Ni plated layer, and the first surface plated layer 3*a*3 is a Sn plated layer. The Ni plated layer can prevent the base electrode layer from being eroded by the solder when mounting the ceramic electronic component, and the Sn plated layer can improve wettability of the solder when mounting the ceramic electronic component, and facilitate mounting. In other words, the first inner plated layer 3*a*2 has a lower solder wettability than the first surface plated layer 3*a*3**.

Internal Configuration of Multilayer Body (WT Cross-Section)

Based on FIG. 3, the internal structure of the multilayer body 2 will be described based on a state viewed from the second end surface E2. FIG. 3 is a cross-sectional view taken along the line II-II of the multilayer ceramic capacitor shown in FIG. 1. As shown in FIG. 3, the multilayer body 2 includes, in the width direction W, an electrode counter portion WF in which the internal electrode layers 5 are opposed to each other, and a first side gap portion SG1 and a second side gap portion SG2 which are two side gap portions SG that sandwich the electrode counter portion WF. The first side gap portion SG1 is located between the electrode counter portion WF and the first lateral surface S1, and the second side gap portion SG2 is located between the electrode counter portion WF and the second lateral surface S2.

Specifically, the first side gap portion SG1 is located between ends of the internal electrode layers 5 adjacent to the first lateral surface S1 and the first lateral surface S1, and the second side gap portion SG2 is located between ends of the internal electrode layer 5 adjacent to the second lateral surface S2 and the second lateral surface S2. The first side gap portion SG1 and the second side gap portion SG2 do not include the internal electrode layer 5, but include only the dielectric layers 7. The first side gap portion SG1 and the second side gap portion SG2 function as protective layers of the internal electrode layers 5. Since the side gap portion SG is a section in the width direction W, it is also referred to as a W gap.

The length of each of the side gap portions SG in the width direction W may be, for example, about 5 μm or more and about 30 μm or less.

Size of Multilayer Ceramic Capacitor

The dimension in the length direction L of the entire multilayer ceramic capacitor 1 including the multilayer body 2 and the external electrodes 3 may be, for example, about 0.2 mm or more and about 3.5 mm or less. The dimension of the entire multilayer ceramic capacitor 1 in the lamination direction T may be, for example, about 0.1 mm or more and about 2.8 mm or less. The dimension of the entire multilayer ceramic capacitor 1 in the width direction W may be, for example, about 0.1 mm or more and about 2.8 mm or less.

In the present example embodiment, the multilayer ceramic capacitor 1 is a two-terminal capacitor. The multilayer ceramic capacitor 1 is not limited to such a two-terminal capacitor, and may be a capacitor having three or more terminals.

Coverage of Internal Electrode Layer

The multilayer ceramic capacitor 1 of the present example embodiment includes features in the coverage of the internal electrode layers 5. The distribution of coverage in the plane of an internal electrode layer 5 will be described with reference to FIG. 4. FIG. 4 is a cross-sectional view of the multilayer body 2 corresponding to the cross-sectional view taken along the line III-III of the multilayer ceramic capacitor shown in FIG. 1. In other words, FIG. 4 shows the LW cross section of the multilayer body 2 at the position where the first internal electrode layer **5*a* is present. Since FIG. 4 is a cross-sectional view of the multilayer body 2, the external electrodes 3 are not shown in FIG. 1. Hereinafter, a first internal electrode layer 5*a* will be described as the internal electrode layer 5**. The first internal electrode layer 5*a* extends from the first end surface E1 toward the second end surface E2. The first internal electrode layer 5*a* is located at the first end gap portion EG1 and the electrode counter portion LF in the length direction L of the multilayer body 2.

The first internal electrode layer 5*a* includes a plurality of regions having different coverages in its plane. Specifically, the first internal electrode layer 5*a* includes four regions from the first region A1 to the fourth region A4, and each of the four regions has a different coverage.

Coverage

Each of the internal electrode layers 5 is made of the above-described metal material. However, each of the internal electrode layers 5 is not filled with the metal material without any gap. Each of the internal electrode layers 5 includes a hollow portion in which a metal material does not exist. Therefore, the ratio of the metal material in each of the internal electrode layers 5 is defined as coverage. Coverage may also be referred to as covering ratio. A method of measuring coverage will be described later.

First to Fourth Regions

As described above, the first internal electrode layer 5*a* includes the four regions each having a different coverage, i.e., the first region A1 to the fourth region A4. The order of the coverages of the first region A1 to the fourth region A4 is as follows: the first region A1>the second region A2>the third region A3>the fourth region A4.

The arrangement of each region in the first internal electrode layer 5*a* is as follows. The first region A1, the third region A3, the second region A2, and the fourth region A4 are arranged in this order from the first end surface E1 toward the second end surface E2. Specifically, the first region A1 and the third region A3 are provided in the first end gap portion EG1, and the second region A2 and the fourth region A4 are provided in the electrode counter portion LF. In other words, the first region A1 and the third region A3 occupy the first end gap portion EG1, and the second region A2 and the fourth region occupy the electrode counter portion LF.

In the multilayer ceramic capacitor 1 of the present example embodiment, since each of the internal electrode layers 5 includes a plurality of regions each having a different coverage, it is possible to maintain both connectivity between the internal electrode layers 5 and the external electrodes 3 and a reduction or prevention of peeling between the internal electrode layers 5 and the dielectric layers 7. Hereinafter, features in the arrangement of the regions will be described in order.

Feature 1

Each of the internal electrode layers 5 includes the plurality of regions each having a different coverage. The first region A1 having a large coverage is provided at a position facing the first end surface E1. Regions with small coverage are provided at another position.

Connectivity

The first region A1 having a large coverage is provided at a position where the first internal electrode layer 5*a* is connected to the first external electrode 3*a*. Therefore, it is possible to make the connectivity between the first internal electrode layer 5*a* and the first external electrode 3*a* favorable.

Reduction or Prevention of Peeling

The first internal electrode layer 5*a* includes the second region and the third region which are regions each having a small coverage. The small coverage region can improve the adhesion between the first internal electrode layers 5*a* and the inner dielectric layers 7*b*. With such a configuration, it is possible to reduce or prevent the peeling between the first internal electrode layers 5*a* and the inner dielectric layers 7*b*. The reasons why the adhesion is improved are as follows. In the first internal electrode layers 5*a* having a small coverage, there are many hollow portions or cavities, through holes, depressions, and the like, as compared with the first internal electrode layer 5*a* having a large coverage. The dielectric of the inner dielectric layer 7*b* easily enters the hollow portions, the through holes, and the depressions. The dielectric of the inner dielectric layer 7*b* enters the inside of the first internal electrode layer 5*a*, such that the adhesion between the first internal electrode layer 5*a* and the inner dielectric layer 7*b* is improved.

As described above, a region having a large coverage is provided at a position in the first internal electrode layer 5*a* connected to the first external electrode 3*a*, and a region having a small coverage is provided at a position not directly involved in the connection with the first external electrode 3*a*. Therefore, it is possible to achieve and maintain both the improvement of connectivity between the first external electrode 3*a* and the first external electrode 3*a* and the reduction or prevention of peeling between the first internal electrode layer 5*a* and the inner dielectric layer 7*b*.

Feature 2

The first internal electrode layer 5*a* includes the second region A2 and the third region A3, each having a smaller coverage than the first region A1. The third region A3 is provided between the first region A1 and the second region A2 and is in the end gap portion EG1. The coverage of the third region A3 is smaller than the coverage of the second region A2.

By arranging the first region A1 to the third region A3 as described above, it is possible to improve the adhesion between the first internal electrode layer 5*a* and the inner dielectric layer 7*b* without sacrificing both the connectivity between the first internal electrode layer 5*a* and the first external electrode 3*a* and the generation of capacitance.

The third region A3 having the smallest coverage among the first region A1 to the third region A3 is provided not in the electrode counter portion LF, but rather in the first end gap portion EG1.

Therefore, even if the coverage of the third region A3 is small, the capacitance generation is not inhibited.

In addition, the third region A3 is provided not adjacent to the first end surface E1, but rather adjacent to the electrode counter portion LF in the first end gap portion EG1. Therefore, although the third region A3 is provided in the first end gap portion EG1, the third region A3 does not face the first end surface E1. As described above, even when the coverage of the third region A3 is small, the connectivity with the external electrode 3 is not impaired.

On the other hand, since the third region A3 has a small coverage, it is possible to improve the adhesion between the first internal electrode layer 5*a* and the inner dielectric layer 7*b* as described above.

As described above, since the third region A3 having a small coverage is provided adjacent to the electrode counter portion LF in the first end gap portion EG, it is possible to improve the adhesion between the first internal electrode layer 5*a* and the inner dielectric layer 7*b* without sacrificing both the capacitance generation and the connectivity between the first internal electrode layer 5*a* and the first external electrode 3*a*.

Feature 3

The fourth region A4 is provided at an end portion of the second region A2 opposite to the first end gap portion EG1. The fourth region A4 is a region having the smallest coverage among the first region A1 to the fourth region A4. Further, as described later, the length of the fourth region A4 in the length direction L is much shorter than the length of the second region A2 in the length direction.

By arranging the fourth region A4 as described above, it is possible to improve the adhesion between the first internal electrode layer 5*a* and the inner dielectric layer 7*b* without sacrificing capacitance generation.

As described later, the fourth region A4 is provided at a portion corresponding to an end portion when the internal electrode layer 5 is formed on the dielectric layer 7 by coating or the like. Therefore, the thickness of each of the first internal electrode layers 5*a* in the fourth region A4 gradually decreases toward the end portion thereof. That is, the cross section is obliquely sloped. Therefore, it can be recognized that the end portion of each of the first internal electrode layers 5*a* in which the fourth region A4 is provided is a region that hardly contributes to capacitance generation. Therefore, even if the coverage of the fourth region A4 is small, the influence on the capacitance generation is not large.

On the other hand, the end portion of each of the internal electrode layers 5 is a portion where peeling from the dielectric layer 7 easily occurs. Therefore, by arranging the fourth region A4 at the end portion of each of the first internal electrode layers 5*a*, it is possible to reduce or prevent the peeling between the first internal electrode layer 5*a* and the inner dielectric layer 7*b* effectively.

As described above, by arranging the fourth region A4 having the smallest coverage at the end portion adjacent to the second end surface E2 of each of the first internal electrode layers 5*a*, it is possible to improve the adhesion between the first internal electrode layer 5*a* and the inner dielectric layer 7*b* without sacrificing capacitance generation.

The configuration of each region based on the first internal electrode layer 5*a* has been described above. The same applies to the second internal electrode layer 5*b*. The arrangement of each region in the second internal electrode layer 5*b* will be described later with reference to FIG. 7.

Length of Each Region

A preferable length of each region in the length direction L and a preferable ratio of each region to the length of the end gap portion EG1, that is, the length of the L gap in the length direction L, will be described. First, the first region A1 and the third region A3 provided in the end gap portion EG1 are as follows. The length of the first region A1 is preferably about 5 μm or more and about 15 μm or less, and the ratio of the length of the first region A1 to the L gap is preferably about 8% or more and about 25% or less, for example. The length of the third region A3 is preferably about 16 μm or more and about 45 μm or less, and the ratio of the length of the third region A3 to the L gap is preferably about 26% or more and about 75% or less, for example. Next, the second region A2 and the fourth region A4 provided in the electrode counter portion LF are as follows. The length of the second region A2 is preferably about 1840 μm or more and about 1880 μm or less, and the ratio of the length of the second region A2 to the L gap is preferably about 3067% or more and about 3133% or less, for example. The length of the fourth region A4 is preferably about 1 μm or more and about 30 μm or less, and the ratio of the length of the fourth region A4 to the L gap is preferably about 2% or more and about 50% or less, for example. The above-described numerical values are non-limiting examples, and can be appropriately changed depending on the size of the multilayer ceramic capacitor 1 or the like.

Next, a method of measuring coverages and determining regions will be described.

Coverage Measurement Method

Coverages are measured as follows. As described above, each of the internal electrode layers 5 includes hollow portions in which no metal is present. Therefore, the ratio of the metal occupied in each of the internal electrode layers 5 is defined as a coverage.

However, when the internal electrode layers 5 and the dielectric layers 7 are laminated, a portion of the hollow portions of the internal electrode layers 5 may be filled with a dielectric material. Thus, the coverage is defined as metal/(metal+(hollow portion or dielectric)). That is, the entire internal electrode layer 5 is defined as the sum of (i) a metal, (ii) a portion existing as a hollow portion without being filled with a dielectric, and (iii) a portion filled with a dielectric in the hollow portion. The ratio of (i) the metal to the entire internal electrode layer 5 is defined as a coverage.

Specifically, the coverage can be calculated through the following steps 1 and 2. Step 1: A surface including the length direction L and the lamination direction T of the multilayer body 2 is polished. In other words, the LT surface of the multilayer body 2 is polished to the middle portion in the width direction W so that an LT cross section of the internal electrode layers 5 is exposed. Step 2: The exposed LT cross section of the internal electrode layers 5 is divided into regions, each having a predetermined length in the length direction L, and the ratio of the metal to the entirety for each divided region is determined. The calculated ratios are the coverages. The predetermined length is set to, for example, about 2% or more and about 3% or less of the entire length of the internal electrode layers 5 in the length direction L. In addition, this length is merely an example, and can be appropriately changed according to the size of the multilayer ceramic capacitor 1, the size of the end gap portion, or the like. For example, the predetermined length may be about 50 μm.

Figure 5:
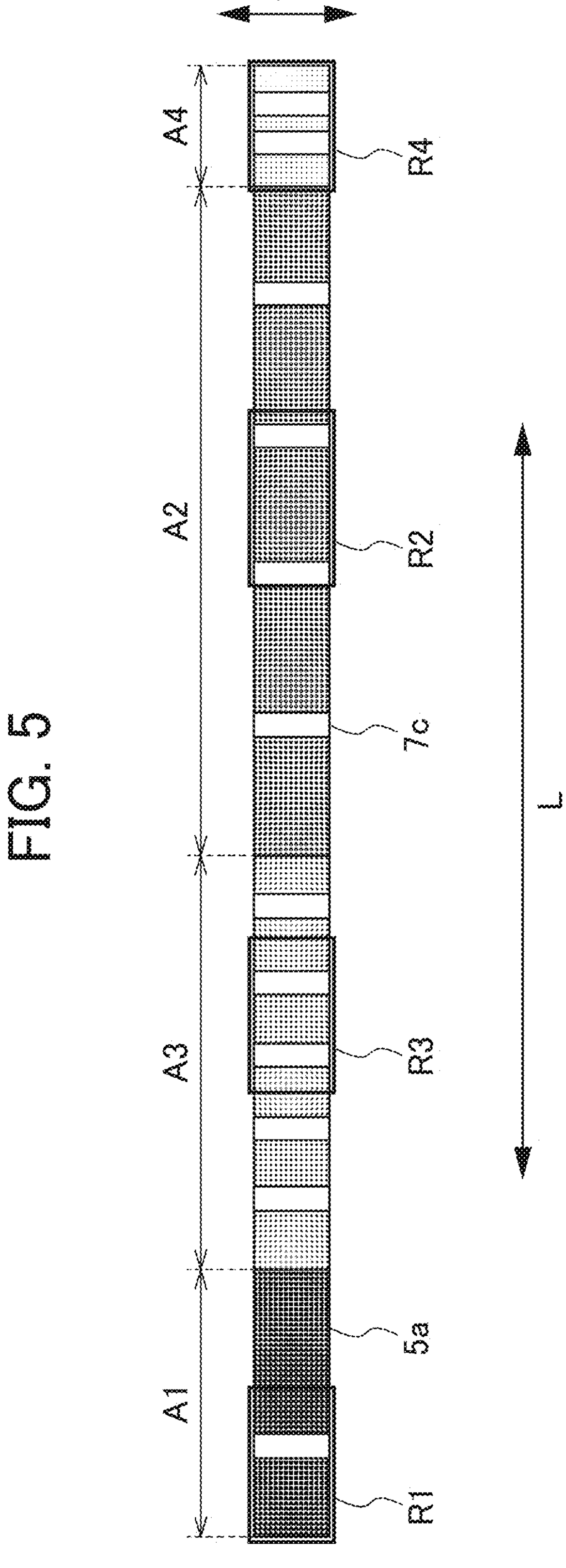
FIG. 5 is a view of an LT cross section of an internal electrode layer.

Hereinafter, an example of measuring the coverages will be described with reference to FIG. 5. FIG. 5 is a view of an LT cross section of the internal electrode layer 5. Specifically, FIG. 5 is a view of an LT cross section of the first internal electrode layer 5*a* shown in FIG. 4. FIG. 5 shows four frames R1 to R4 as outer frames of portions where coverages are measured. In each of these frames, the ratio of a metal to the entirety is determined. In FIG. 5, the dielectric of the dielectric layer 7 entering the hollow portions of the internal electrode layer 5, i.e., the dielectric material, is shown as a dielectric 7*c* in the hollow portion.

Procedure for Measuring Coverage

The procedure for measuring coverage is as follows. First, a region in a frame is observed by an optical microscope in the field of view. Then, the length L2 in the length direction L of the entire internal electrode layer within the field of view of the optical microscope is obtained. The length L1 in the length direction L in which the metal is observed within or substantially within the range of the field of view of the optical microscope is obtained. The length obtained by excluding the length of "the region in which the metal of the internal electrode layer is not observed" from the entire length is determined as L1. Then, a ratio is obtained by dividing the length L1 by the length L2, and the obtained ratio is determined as a coverage.

Determination of Region by Coverage

Determination of the regions based on the coverage values obtained as described above will be described. A region having a coverage of about 95% or more, for example, is determined to be the first region A1 having a large coverage. A region having a coverage of about 80% or more and less than about 95%, for example, is determined to be the second region A2 having an intermediate coverage. A region having a coverage of about 70% or more and less than about 80%, for example, is determined to be the third region A3 having a small coverage. A region having a coverage of about 50% or more and less than about 70%, for example, is determined to be the fourth region A4 having the minimum coverage.

First Internal Electrode Layer and second Internal Electrode Layer

Figure 6:
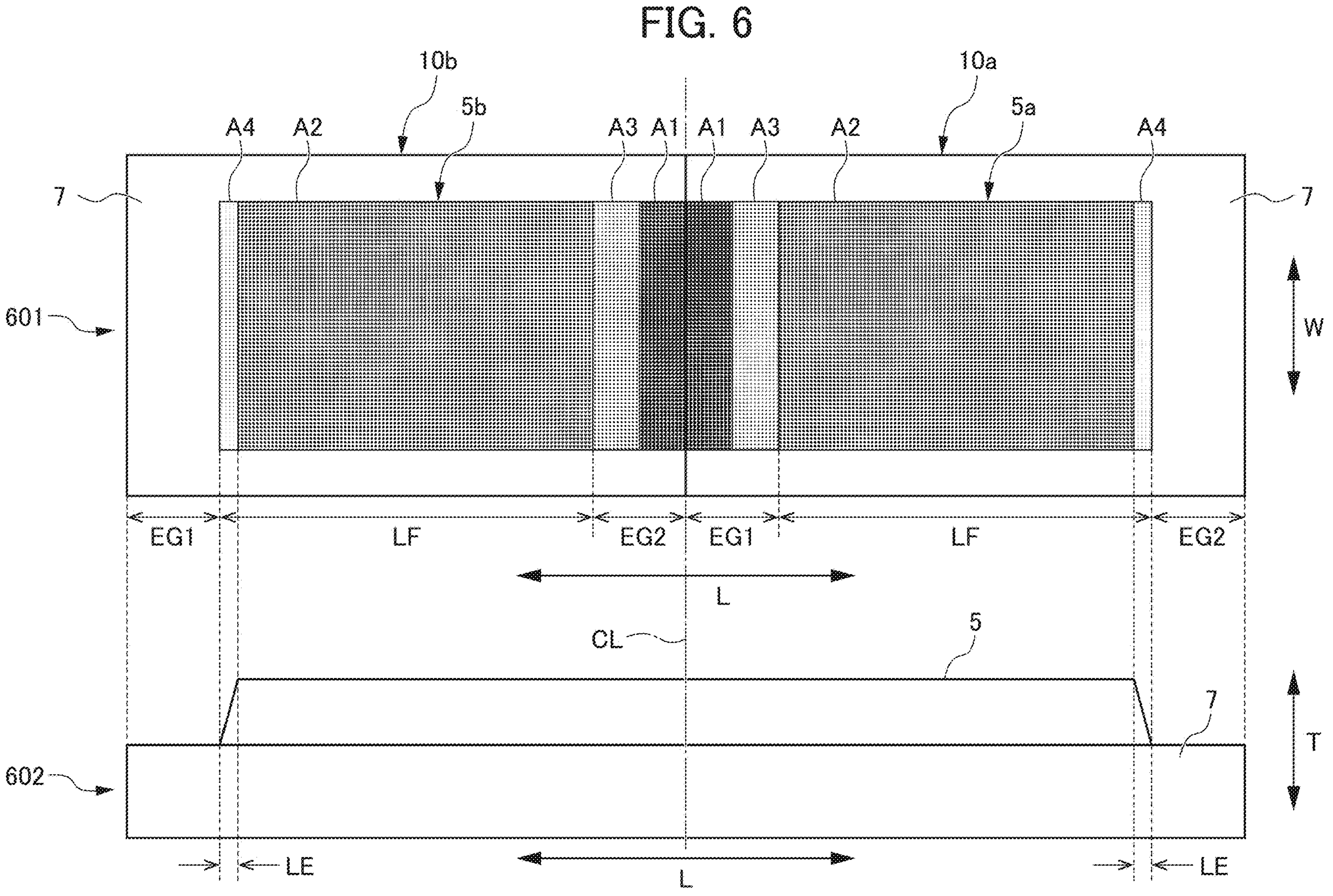
FIG. 6 is a view of a state in which an internal electrode layer is provided on a dielectric layer.

The relationship between the first internal electrode layer 5*a* and the second internal electrode layer 5*b* will be described with reference to FIGS. 6 and 7. FIG. 6 is a view of a state in which the first internal electrode layer 5*a* and the second internal electrode layer 5*b* are provided on the upper surface of the dielectric layer 7. FIG. 6 shows a view 601 and a view 602. The view 601 shows an LW cross section of the multilayer body 2, and the view 602 shows an LT cross section corresponding to the view 601. As shown in the view 601, the first internal electrode layer 5*a* and the second internal electrode layer 5*b* are provided on the dielectric layer 7. This is referred to as a pre-cut sheet 10. The pre-cut sheet 10 is cut into two pieces along the cutting line CL. One of the cut sheets is referred to as a first cut sheet 10*a*, and the other is referred to as a second cut sheet 10*b*.

Figure 7:
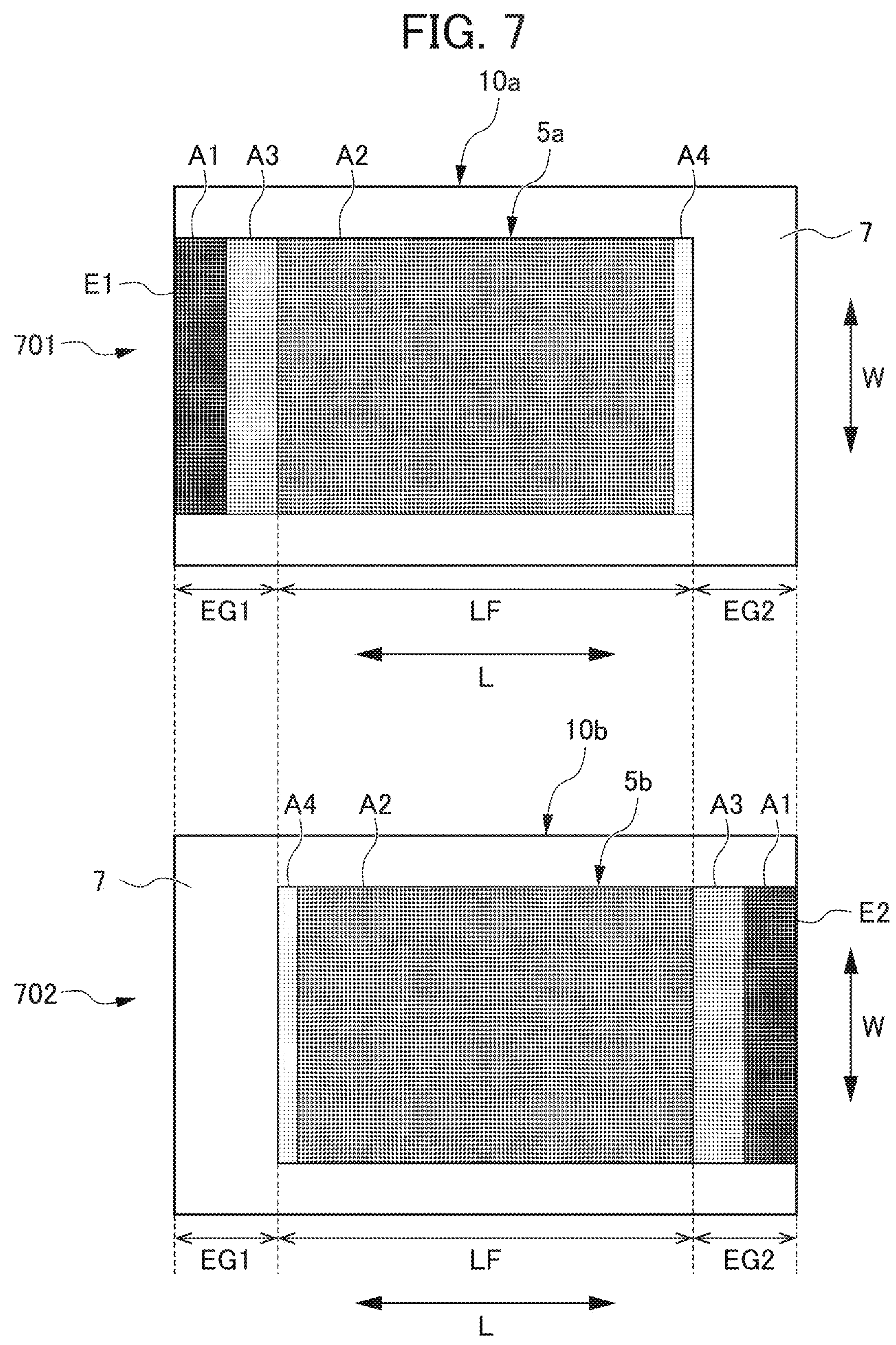
FIG. 7 is a view of a cut sheet.

FIG. 7 shows the first cut sheet 10*a* and the second cut sheet 10*b*. FIG. 7 shows a view of the first cut sheet 10*a* and a view of the second cut sheet 10*b*. A view 701 of FIG. 7 shows an LW cross section of the first cut sheet 10*a*, and a view 702 shows an LW cross section of the second cut sheet 10*b*. The inner layer portion IL of the multilayer body 2 can be formed by laminating a plurality of the first cut sheets 10*a* shown in the view 701 and a plurality of the second cut sheets 10*b* shown in the view 702 in order.

Pre-Cut Sheet

The pre-cut sheet 10 will be specifically described with reference to FIG. 6. As described above, the dielectric layer 7 is provided with the internal electrode layer 5 corresponding to the first internal electrode layer 5*a* and the internal electrode layer 5 corresponding to the second internal electrode layer 5*b*. Then, by being cut along the cutting line CL, each of the internal electrode layers 5 is divided into the first internal electrode layer 5*a* and the second internal electrode layer 5*b*. The dielectric layer 7 is also provided with portions where the internal electrode layer 5 is not provided, at both ends in the length direction L. These portions each function as the end gap portion EG in the multilayer body 2. Due to the positional relationship between the dielectric layer 7 and the internal electrode layer 5 in the pre-cut sheet 10 as described above, the portions of the internal electrode layer 5 facing the cutting line CL in the pre-cut sheet 10 become portions connected to the external electrode 3. Therefore, the portions facing the cutting line CL are preferably the first region A1 having a large coverage.

In addition, as shown in FIG. 7, a portion where the first internal electrode layer 5*a* and the second internal electrode layer 5*b* overlap each other in a state where the first cut sheet 10*a* and the second cut sheet 10*b* are stacked functions as the electrode counter portion LF. The electrode counter portion LF generates a capacitance. Therefore, the second region A2 having a next larger coverage after the first region A1 may be provided as a region following the first region A1 located on both sides of the cutting line CL. However, in the end gap portion EG, the portion of the internal electrode layer 5 following the first region A1 does not need to have a large coverage. This is because no capacitance is generated in the end gap portion EG.

Therefore, as shown in FIG. 6, the third region A3 having a coverage smaller than those of the first region A1 and the second region A2 is provided in the end gap portion EG following the first region A1. As a result, as shown in FIG. 7, while the connectivity between the internal electrode layer 5 and the external electrode 3 is maintained, it is possible to reduce or prevent peeling between the internal electrode layer 5 and the dielectric layer 7 by using a portion having a small contribution to the capacitance generation.

Then, as a region following the third region A3 of the internal electrode layer 5, the second region A2 having a larger coverage than the third region A3 is provided at a position corresponding to the electrode counter portion LF. With such a configuration, it is possible to maintain the capacitance generated in the electrode counter portion LF.

Fourth Region

Next, the fourth region A4 will be described. As shown in FIG. 6, the fourth region A4 is provided at both end portions in the length direction L of the internal electrode layer 5 in the pre-cut sheet 10. As indicated by a region LE in the view 602, the end surfaces of both ends of the internal electrode layer 5 in the length direction L are sloped obliquely. That is, the LT cross section of the internal electrode layer 5 has a trapezoidal shape.

When the internal electrode layers 5 are formed on the dielectric layers 7 by screen printing or the like, this end surface of each of the internal electrode layers 5 is inevitably sloped. When each of the internal electrode layers 5 is formed by printing, the paste of the electrode material is spread on the dielectric layer 7 to form a coating film. The end surface of each of the internal electrode layers 5 corresponds to the tip of the printed coating film. Therefore, the end surfaces of the internal electrode layers 5 are sloped.

In this sloped portion, the film thickness of each of the internal electrode layers 5 is reduced. Therefore, such a portion of each of the internal electrode layers 5 hardly contributes to capacitance generation. The end surface of each of the internal electrode layers 5 is also a portion where peeling from the dielectric layer 7 easily occurs. In view of the above, the fourth region A4 having a small coverage is provided in the region LE of each of the internal electrode layers 5. With such a configuration, it is possible to improve the adhesion between the internal electrode layer 5 and the dielectric layer 7 without impairing the capacitance generation.

Coverage Adjustment

An example of a method of adjusting the coverages will be described. In this example, an auxiliary dielectric layer 7*d* is used for coverage adjustment. First, the auxiliary dielectric layer 7*d* will be described. The length of the multilayer body 2 in the lamination direction T preferably has a small difference between the electrode counter portion LF and the end gap portion EG. However, in the inner layer portion IL, the length in the lamination direction T easily differs between the electrode counter portion LF and the end gap portion EG. This is because, in the electrode counter portion LF, a plurality of dielectric layers 7 and a plurality of internal electrode layers 5 are laminated; whereas, in the end gap portion EG, only the dielectric layers 7 are laminated and the internal electrode layers 5 are not laminated. Therefore, in order to reduce the difference in length in the lamination direction T between the end gap portion EG and the electrode counter portion LF, the auxiliary dielectric layer 7*d*, which is an additional dielectric layer 7, may be provided in the end gap portion EG.

Auxiliary Dielectric Layer

Figure 8:
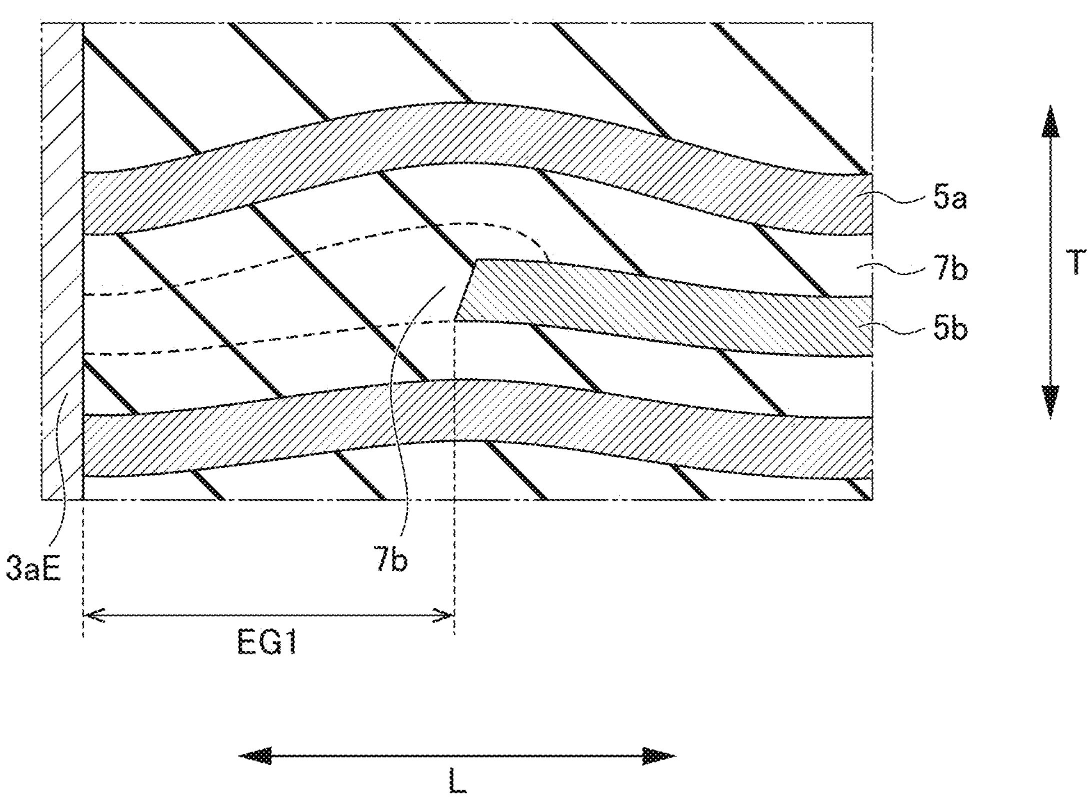
FIG. 8 is a view of an LT cross section of the multilayer ceramic capacitor.
Figure 9:
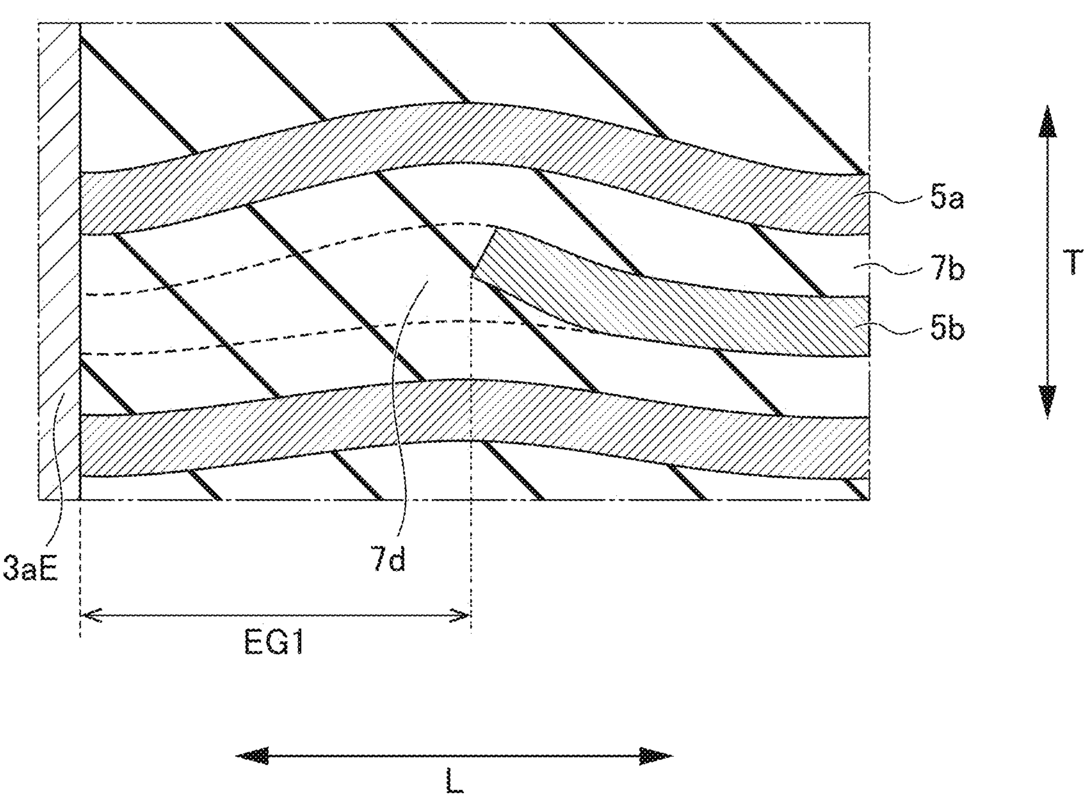
FIG. 9 is a view of an LT cross section of the multilayer ceramic capacitor.

The auxiliary dielectric layer 7*d* will be described with reference to FIGS. 8 and 9. FIGS. 8 and 9 are views of an LT cross section of the multilayer ceramic capacitor 1. FIGS. 8 and 9 simulate the state of a region R5 in FIG. 2. FIGS. 8 and 9 show examples of different configurations in the vicinity of the auxiliary dielectric layer 7*d*. As shown in FIG. 8, in the first end gap portion EG1, the auxiliary dielectric layer 7*d* is provided between the two inner dielectric layers 7*b*. Since the auxiliary dielectric layer 7*d* compensates for the thickness of the second internal electrode layer 5*b*, the difference in length in the lamination direction T between the end gap portion EG and the electrode counter portion LF becomes small.

The configuration shown in FIG. 8 differs from the configuration shown in FIG. 9 in the portion where the auxiliary dielectric layer 7*d* and the second internal electrode layer 5*b* are in contact with each other. In the configuration shown in FIG. 8, the auxiliary dielectric layer 7*d* overlaps the second internal electrode layer 5*b*; whereas, in the configuration shown in FIG. 9, the second internal electrode layer 5*b* overlaps the auxiliary dielectric layer 7*d*. Here, the overlap refers to covering from an upper side in the lamination direction T. The upper side refers to the side of the second main surface M2 with respect to the first main surface M1. The overlap indicates covering from the side of the second main surface M.

The auxiliary dielectric layer 7*d* and the internal electrode layer 5 may or may not overlap each other as described above. That is, instead of covering one of them with the other, the end surfaces of them may be in contact with each other.

The coverage can be adjusted by changing the composition of the auxiliary dielectric layer 7*d*, thereby changing the degree of shrinkage of the auxiliary dielectric layer 7*d* occurring during firing. A metal break may occur in the internal electrode layer 5 due to the shrinkage of the auxiliary dielectric layer 7*d*. In view of the above, the coverage of the internal electrode layer 5 can be adjusted by changing the degree of shrinkage of the auxiliary dielectric layer 7*d*.

Other Coverage Adjustment Method

Other methods of adjusting coverage will be described. When each of the internal electrode layers 5 is formed on the dielectric layer 7 by screen printing, the coverage can be adjusted by adjusting the depth of the opening of the mesh used for screen printing. Specifically, the opening of the mesh is adjusted as follows.

An opening corresponding to the first region A1: large depth (deepest)

An opening corresponding to the second region A2: intermediate depth (depth between deepest and shallowest)

An opening corresponding to the third region A3: small depth (shallowest)

The fourth region A4 can be provided by adjusting the viscosity of the electrically conductive paste to be printed to form the sloped region (the region LE shown in FIG. 6).

Each of the internal electrode layers 5 can also be formed by gravure printing. When each of the internal electrode layers 5 is formed by gravure printing, the coverage of each region can be adjusted by adjusting the area and volume of the opening of the gravure plate corresponding to each region. The area and volume of the opening can also be adjusted by, for example, drawing with a laser.

Whether or not to provide the auxiliary dielectric layer 7*d* can be arbitrarily selected. When the auxiliary dielectric layer 7*d* is provided, the Ni paste and then the paste for the auxiliary dielectric layer 7*d* may be printed in this order, or conversely, the paste for the auxiliary dielectric layer 7*d* and then the Ni paste may be printed in this order. The composition of the auxiliary dielectric layer 7*d* and the composition of the dielectric layer 7 of the other portions may be the same or different. Here, the composition indicates elements constituting the dielectric layer 7 and the amounts thereof. Further, the grain may be different between the auxiliary dielectric layer 7*d* and the dielectric layer 7 of the other portions. The grain of the auxiliary dielectric layer 7*d* may be smaller than the grain of the dielectric layer 7 in other portions, or vice versa.

Sn may be present at the interface between the internal electrode layers 5 and the dielectric layers 7. In addition, as a method of forming the multilayer body 2, a method of post-attaching the first side gap portion SG1 and the second side gap portion SG2 to the electrode counter portion WF can also be used.

Although example embodiments of the present invention have been described above, the present invention is not limited to the above-described example embodiments, and various changes and modifications thereto can be made. While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including a plurality of dielectric layers and a plurality of internal electrode layers that are laminated, the multilayer body further including a first main surface and a second main surface that are opposed to each other in a lamination direction, a first lateral surface and a second lateral surface that are opposed to each other in a width direction orthogonal or substantially orthogonal to the lamination direction, and a first end surface and a second end surface that are opposed to each other in a length direction orthogonal or substantially orthogonal to the lamination direction and the width direction; and external electrodes that are respectively provided on the first end surface and the second end surface and connected to the plurality of internal electrode layers; wherein the plurality of internal electrode layers include a first region, a second region, and a third region respectively including different coverages;

the first region includes a larger coverage than the second region;

the first region is connected to a corresponding one of the external electrodes;

the third region is provided between the first region and the second region; and the third region includes a smaller coverage than the first region and the second region.

2. The multilayer ceramic capacitor according to claim 1, wherein, in a case where a region in which the plurality of internal electrode layers are opposed to one another is defined as an effective region, the second region includes at least a portion of the effective region in which the plurality of internal electrode layers are opposed to one another.

3. The multilayer ceramic capacitor according to claim 1, wherein the first region includes a coverage of about 95% or more; and the second region includes a coverage of about 80% or more and less than about 95%.

4. The multilayer ceramic capacitor according to claim 1, wherein the third region includes a coverage of about 70% or more and less than about 80%.

5. The multilayer ceramic capacitor according to claim 4, wherein the plurality of internal electrode layers include a fourth region at an end portion on an opposite side of the second region than the first region.

6. The multilayer ceramic capacitor according to claim 1, wherein the plurality of internal electrode layers include a fourth region on an opposite side of the second region than the first region; and the fourth region includes a smaller coverage than the first region, the second region, and the third region.

7. The multilayer ceramic capacitor according to claim 6, wherein the fourth region includes a coverage of about 50% or more and less than about 70%.

8. The multilayer ceramic capacitor according to claim 6, wherein a length of the first region is about 5 μm or more and about 15 μm or less, a length of the second region is about 1840 μm or more and about 1880 μm or less, a length of the third region is about 16 μm or more and about 45 μm or less, and a length of the fourth region is about 1 μm or more and about 30 μm or less.

9. The multilayer ceramic capacitor according to claim 1, wherein the multilayer body has a substantially rectangular parallelepiped shape.

10. The multilayer ceramic capacitor according to claim 1, wherein the multilayer body includes at least one of rounded ridge portions or rounded corner portions.

11. The multilayer ceramic capacitor according to claim 1, wherein the multilayer body has a length of about 200 μm or more and about 3500 μm or less, a height in the lamination direction of about 100 μm or more and about 2800 μm or less, and a width of about 100 μm or more and about 2800 μm or less.

12. The multilayer ceramic capacitor according to claim 1, wherein a number of the plurality of dielectric layers is 10 or more and 1800 or less.

13. The multilayer ceramic capacitor according to claim 1, wherein the plurality of dielectric layers includes outer dielectric layers and inner dielectric layers;

a thickness of each of the outer dielectric layers is about 10 μm or more and about 200 μm or less; and a thickness of each of the inner dielectric layers is about 0.3 μm or more and about 5.0 μm or less.

14. The multilayer ceramic capacitor according to claim 1, wherein a number of the plurality of internal electrode layers is 10 or more and 1800 or less.

15. The multilayer ceramic capacitor according to claim 1, wherein the multilayer body includes end gap portions.

16. The multilayer ceramic capacitor according to claim 15, wherein a dimension of each of the end gap portions is about 5 μm or more and about 30 μm or less.

17. The multilayer ceramic capacitor according to claim 1, wherein each of the external electrodes includes a base electrode layer, an inner plated layer and a surface plated layer.

18. The multilayer ceramic capacitor according to claim 1, wherein an entirety of the multilayer ceramic capacitor has a length of about 0.2 mm or more and about 3.5 mm or less, a height of about 0.1 mm or more and about 2.8 mm or less, and a width of about 0.1 mm or more and about 2.8 mm or less.

19. The multilayer ceramic capacitor according to claim 1, wherein each of the internal electrode layers includes a hollow portion without metal.

20. The multilayer ceramic capacitor according to claim 1, wherein each of the internal electrode layers includes four or more regions with different coverages from each other.

* * * * *